United States Patent
DeBusk et al.

(10) Patent No.: US 10,284,285 B2
(45) Date of Patent: May 7, 2019

(54) AUTONOMOUS ANONYMITY

(71) Applicant: FreeFlight Acquisition Corporation, Irving, TX (US)

(72) Inventors: John DeBusk, Southlake, TX (US); William Luetkemeyer, Azle, TX (US)

(73) Assignee: FREEFLIGHT ACQUISITION CORPORATION, Irving, TX (US)

( * ) Notice: Subject to any disclaimer, the term of this patent is extended or adjusted under 35 U.S.C. 154(b) by 396 days.

(21) Appl. No.: 15/041,443

(22) Filed: Feb. 11, 2016

(65) Prior Publication Data

US 2016/0308602 A1 Oct. 20, 2016

Related U.S. Application Data

(60) Provisional application No. 62/116,202, filed on Feb. 13, 2015.

(51) Int. Cl.
| | |
|---|---|
| *G01S 13/78* | (2006.01) |
| *G01S 13/91* | (2006.01) |
| *G01S 13/93* | (2006.01) |
| *G08G 5/00* | (2006.01) |
| *H04B 7/185* | (2006.01) |
| *H04W 4/06* | (2009.01) |
| *G01S 13/76* | (2006.01) |

(52) U.S. Cl.
CPC ....... *H04B 7/18523* (2013.01); *G08G 5/0008* (2013.01); *G08G 5/0013* (2013.01); *G08G 5/0078* (2013.01); *H04B 7/18578* (2013.01); *H04W 4/06* (2013.01); *G01S 13/765* (2013.01); *G01S 13/781* (2013.01); *G01S 13/91* (2013.01); *G01S 13/9303* (2013.01); *G08G 5/0021* (2013.01); *G08G 5/0043* (2013.01)

(58) Field of Classification Search
CPC .. G08G 5/0008; G08G 5/0013; G08G 5/0082; G08G 5/0026; G08G 5/0078; G08G 5/0021; G08G 5/025; G08G 5/0043; G08G 5/0065; G08G 5/065; H04B 7/18506; G01S 13/784; G01S 5/0072; G01S 5/0226; G01S 13/781; G01S 13/9303; G01S 13/765; G01S 13/91; G01S 19/14

See application file for complete search history.

(56) References Cited

U.S. PATENT DOCUMENTS

| | | | | |
|---|---|---|---|---|
| 5,629,692 | A * | 5/1997 | Stayton | G01S 13/9303 340/635 |
| 6,433,729 | B1 * | 8/2002 | Staggs | G01S 7/12 342/179 |
| 8,102,301 | B2 * | 1/2012 | Mosher | G08G 5/0013 342/30 |
| 2002/0075179 | A1 * | 6/2002 | Hudson | G01S 13/765 342/30 |
| 2013/0307717 | A1 * | 11/2013 | Watson | G01S 13/9303 342/37 |
| 2014/0327564 | A1 * | 11/2014 | Sampigethaya | H04L 9/3215 342/32 |
| 2016/0170025 | A1 * | 6/2016 | Johnson | G01S 19/14 342/357.4 |

* cited by examiner

*Primary Examiner* — Olumide Ajibade Akonai
(74) *Attorney, Agent, or Firm* — Haynes and Boone, LLP

(57) ABSTRACT

An autonomous anonymity system includes a universal access transceiver. The universal access transceiver is designed and arranged to selectively provide a notification when autonomous aircraft operation is authorized.

2 Claims, 2 Drawing Sheets

AUTONOMOUS ANONYMITY

CLAIM OF PRIORITY

This application claims the benefit of U.S. Provisional Application No. 62/116,202, filed Feb. 13, 2015, entitled "Autonomous Anonymity," the contents of which are expressly incorporated by reference herein.

FIELD

The present disclosure relates generally to avionics, and more specifically to Automatic Dependent Surveillance Broadcast (ADS-B) systems.

BACKGROUND

To operate in most controlled airspace within the United States today, a transponder, which responds to interrogation from surveillance radar systems, is required. In response to an interrogation, a transponder transmits altitude information (Mode C) and a four digit identifying "squawk" code to the radar site (Modes A and C). The squawk code to be transmitted is entered in the cockpit. When flying visual flight rules (VFR) in Class E airspace in the United States, the code 1200 is typically squawked. When entering congested airspace, such as Class B, C, or D airports, when flying in Class A airspace, or when flying under instrument flight rules (IFR), air traffic control (ATC) may assign and request an aircraft to squawk a particular identifying code.

Presently, next generation technology, in the form of ADS-B, is being implemented in the United States. ADS-B is an aircraft surveillance and traffic management technology and system for enhancing situational awareness, in which location messages are sent periodically by aircraft without the need for interrogation from a ground station. The system is dependent on aircraft being equipped with high integrity position sources, such as Wide Area Augmentation System (WAAS) Global Positioning System (GPS) receivers. ADS-B provides real-time surveillance services to both Air Traffic Control stations and to appropriately equipped aircraft.

ADS-B makes use of two operating frequencies—978 MHz and 1090 MHz: Aircraft may transmit position information (referred to as ADS-B OUT) at 1090 MHz using an Extended Squitter equipped transponder or, if limited to operating below flight level 180 (approximately 18,000 feet), at 978 MHz using Universal Access Transceiver (UAT). ADS-B OUT information may be directly received by other similarly-equipped aircraft and by ground stations within line-of-sight.

Aircraft may receive position information of other aircraft and about obstacles, as well as weather and other information (referred to as ADS-B IN). ADS-B equipped 1090 MHz aircraft may directly receive both position information from other ADS-B equipped 1090 MHz aircraft and Traffic Information Services Broadcasts (TIS-B) from ground stations. Similarly, ADS-B equipped 978 MHz aircraft may directly receive both position information from other ADS-B equipped 978 MHz aircraft and TIS-B from ground stations. TIS-B provides traffic and obstacle information within a cylindrical volume of airspace about the aircraft. TIS-B data includes self-reported position data from both 1090 MHz and 978 MHz ADS-B OUT equipped aircraft and basic position data from non-ADS-B OUT equipped aircraft within radar range of the ground station. Moreover, ADS-B equipped 978 MHz aircraft may receive Flight information Services Broadcasts (FIS-B) which includes subscription-free graphical and textual weather data. Due to congestion of the 1090 MHz frequency, FIS-B is only provided at 978 MHz.

BRIEF DESCRIPTION OF THE DRAWINGS

Embodiments are described in detail hereinafter with reference to the accompanying figures, in which.

DETAILED DESCRIPTION

Figure 1:
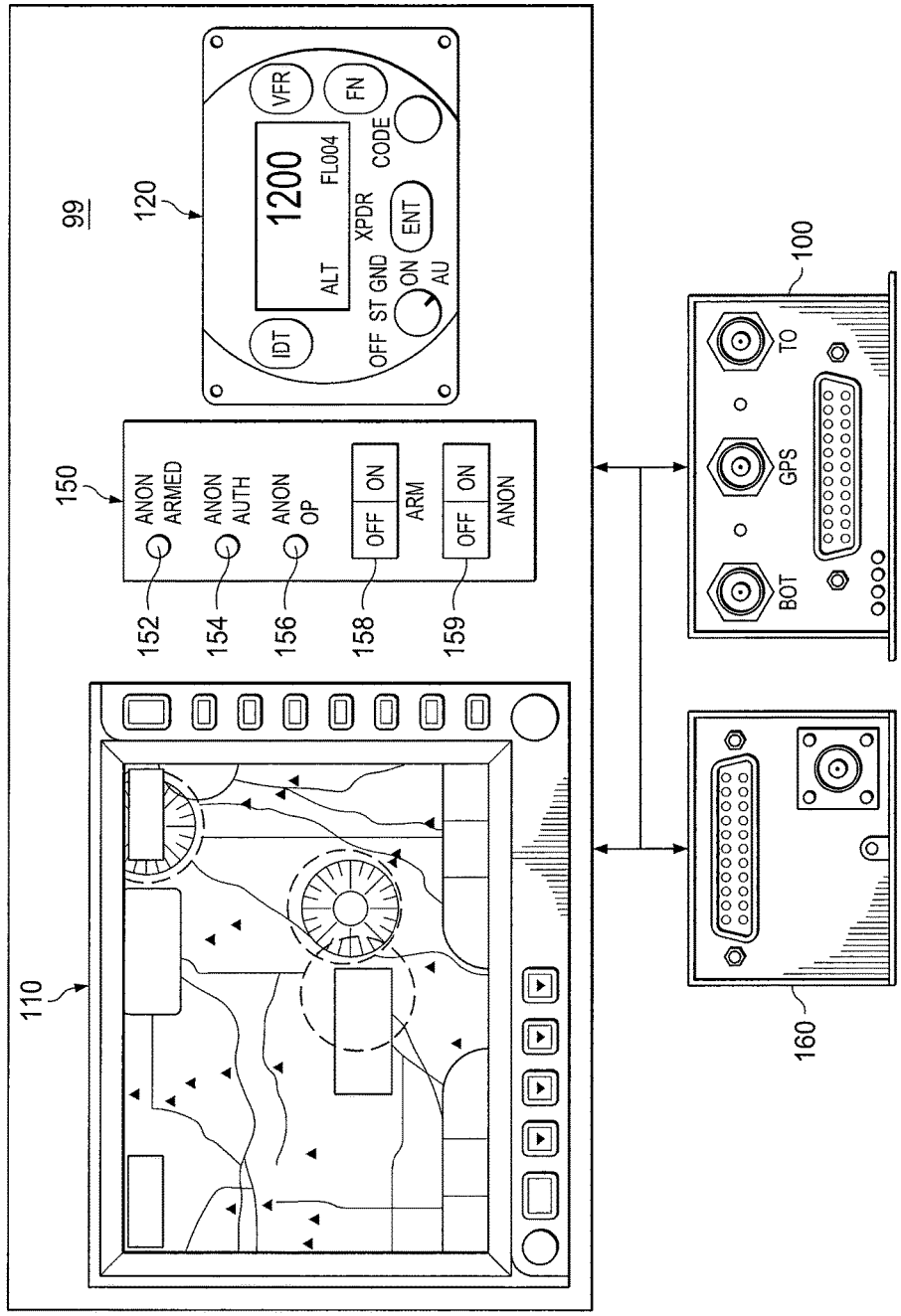
FIG. 1 is a block diagram of an autonomous anonymity aircraft ADS-B system according to an embodiment, showing an exemplary aircraft panel with glass panel display, UAT control head, and annunciators, and a remotely located UAT transceiver and transponder.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "left," "right," "front," "back," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

There may be many legitimate reasons why aircraft, including business jets, may wish to operate anonymously. For example, a celebrity may wish to avoid paparazzi, or a business executive may wish to avoid disclosure of the nature of business dealings gleaned from his travels. The present disclosure describes a method and system for facilitating anonymous aircraft operation.

New government mandates require that aircraft operating at or above flight level 180 (Class A airspace) be equipped with a Mode-S Extended Squitter transponder by the year 2020. A UAT for ADS-B OUT is not authorized in Class A airspace in order to support continued use of the traffic collision avoidance system (TCAS). In addition to responding ("squawking") to ATC interrogations, a mode S transponder automatically transmits, or "squitters" a International Civil Aviation Organization (ICAO) 24-bit aircraft address once per second. The ICAO aircraft address uniquely identifies an aircraft from all other registered aircraft in the world. In addition to the 24-bit ICAO address, the Extended Squitter message format, a total of 112 bits, also includes a 5-bit downlink format, a 3-bit capability field, a 24-bit parity check, and a 56-bit ADS-B payload (message type, sub-type, status, etc.). A "squit" transmitted by an aircraft may be received and interpreted by any party within line of sight having a suitable 1090 MHz receiver. Accordingly, because a unique aircraft addressed is transmitted, anonymity may not be maintained.

Similarly, aircraft equipped with a 978 MHz UAT ADS-B transmitter periodically transmits an ADS-B OUT message, which also contains a 24-bit aircraft address. However, the UAT standard also supports an anonymous function for use in certain conditions wherein a random 24-bit aircraft address, which does not reveal the aircraft tail number, is generated by the UAT and transmitted. Such feature is, in effect, similar to squawking code 1200, thereby preserving anonymity.

FIG. 1 is a functional block diagram of various aircraft avionics components of an aircraft. An exemplar aircraft panel 99 is depicted, with an optional glass panel display 110, an optional annunciator panel 150, and an optional UAT and/or transponder control head 120. Other instruments and components (not expressly illustrated) may be provided as appropriate. According to one or more embodiments, the aircraft may include a UAT 100 and an Extended Squitter transponder 160. UAT 100 and transponder 160 may be remotely located from panel 99, as shown. However, UAT 100 and transponder 160 could also be located on panel 99.

In one or more embodiments, transponder 160 may include receiver circuitry tuned to receive interrogation signals from ground radar stations at 1030 MHz and squawk and squit signals from other aircraft at 1090 MHz. Transponder 160 may also include transmitter circuitry tuned to transmit squawk and squit signals. The receiver and transmitter circuitry may include oscillators, phase lock loops, amplifiers, frequency multipliers, frequency dividers, filters, phase detectors, mixers, and like circuitry. Transponder 160 may also include digital logic circuitry for encoding altitude, identification information, squawk codes, and other ADS-B OUT data, as well as for remote control and communication with transponder control head 120, UAT 100, and/or other avionics equipment. Digital logic circuitry may include a microprocessor, microcontroller, field-programmable gate array, memory, driver, multiplexor, universal asynchronous receiver/transmitter, and the like. Memory may include both random access memory (RAM) and non-volatile memory such as Flash memory or electrically erasable programmable read-only memory (EEPROM). Discrete electronic components may be combined in one or more application-specific integrated circuits (ASICs) as appropriate. Transponder 160 may be arranged to transmit a squawk code and altitude entered in the cockpit in response to a received interrogation and, in mode S, to transmit a squit once per second.

Similarly, in one or more embodiments, UAT 100 may include receiver circuitry tuned to receive squit signals from ground stations and other aircraft at 978 MHz. UAT 100 may also include transmitter circuitry tuned to transmit squit signals at 978 MHz. The receiver and transmitter circuitry may include oscillators, phase lock loops, amplifiers, frequency multipliers, frequency dividers, filters, phase detectors, mixers, and like circuitry. UAT 100 may also include digital logic circuitry for encoding ADS-B OUT data, as well as for remote control and communication with UAT control head 120, transponder 160, and/or other avionics equipment. Digital logic circuitry may include a microprocessor, microcontroller, field-programmable gate array, memory, driver, multiplexor, universal asynchronous receiver/transmitter, and the like. Memory may include both random access memory (RAM) and non-volatile memory such as Flash memory or electrically erasable programmable read-only memory (EEPROM). Discrete electronic components may be combined in one or more application-specific integrated circuits (ASICs) as appropriate. UAT 100 may be arranged to transmit a squit once per second and to decode received squits for graphical display of traffic information in the cockpit.

In one or more embodiments, UAT 100 is operatively connected with and capable of controlling transponder 160. UAT 100 may also be operatively connected to glass panel display 110, to control head 120, and or to annunciator panel 150. The operative connections may be via RS-232 serial connection, via a wifi connection, or via a proprietary connection scheme, for example.

According to one or more embodiments, UAT 100 includes an automatic anonymity functionality. UAT 100 may have such functionality armed, or enabled, in the cockpit. When flying in Class A airspace, an aircraft using transponder 160 in Mode S cannot maintain anonymity. However, when the aircraft operates below 18,000 feet mean sea level, such as when climbing from take-off or descending for approach, UAT 100, when so armed, may automatically begin ADS-B OUT transmissions at 978 MHz anonymously, using a random 24 bit aircraft address, and simultaneously control transponder 160, if compatible, to switch from mode S operation to mode A or C operation and squawk 1200 (or other four-digit code assigned by ATC). Alternatively, UAT 100 may notify the pilot when conditions have been met for anonymous operation, and the pilot may then operate UAT 100 and/or transponder 160 to provide anonymous operation. Pilot notification may occur via control head 120, glass panel display 110, one or more visual lights 152, 154, 156 on annunciator panel 150, and/or via an audible annunciator (not illustrated). Other indicators may also be provided, as appropriate.

Figure 2:
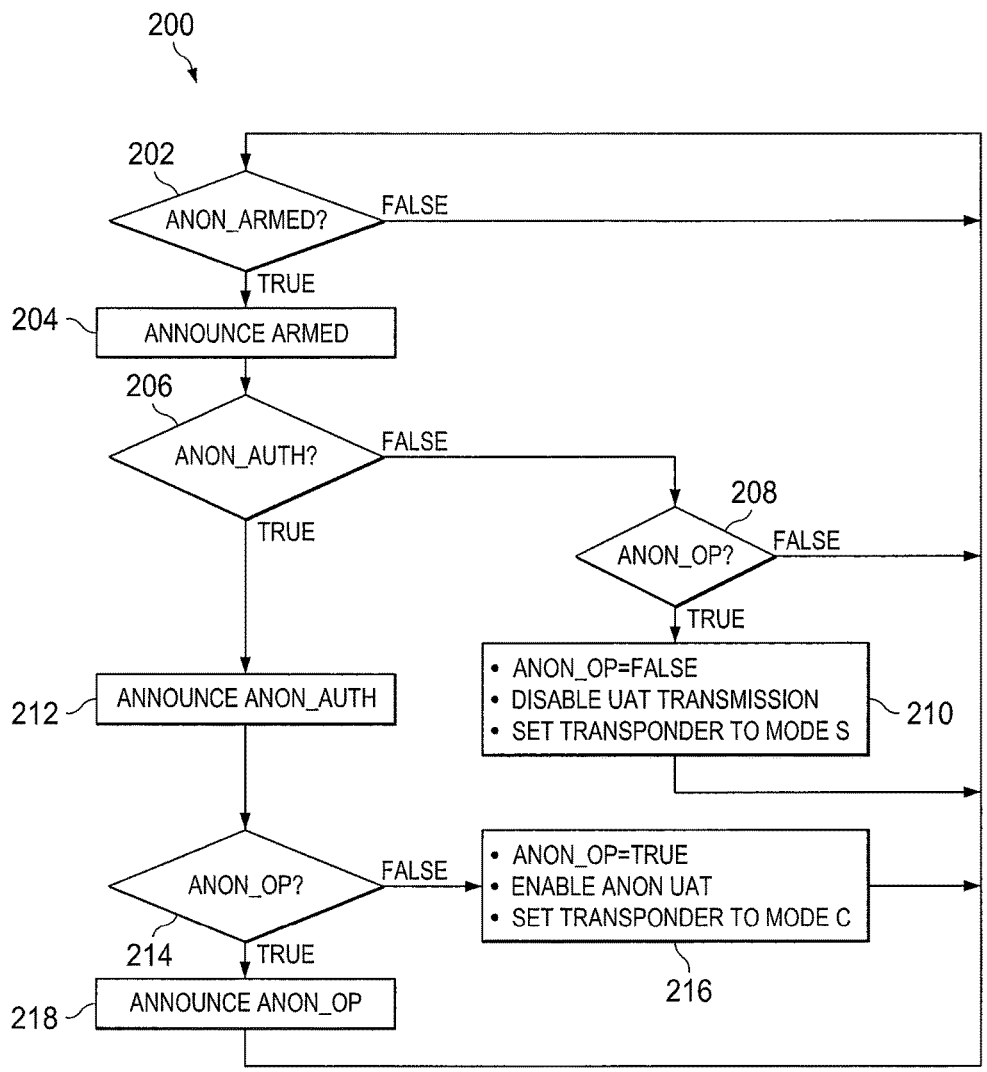
FIG. 2 is a flowchart of the method for autonomous anonymity operation according to an embodiment.

FIG. 2 is a flowchart of a method 200 for autonomous anonymity according to one or more embodiments. In some embodiments, method 200 is performed by a computer processor of UAT 100. For instance, UAT 100 may include a processor, such as a general-purpose processor or an application specific integrated circuit (or other processor) that reads code from a computer readable medium (such as on board Read Only Memory) and executes that code to provide the functionality of method 200. The computer readable code may be included in hardware or software, and it includes instructions that when executed provide the functionality of method 200.

Referring to both FIGS. 1 and 2, at decision box 202, a first state variable, ANON_ARMED, may be evaluated. Variable ANON_ARMED may have the values TRUE, which means UAT 100 is an armed state for autonomous operation, or FALSE, which means UAT 100 operates normally. If ANON_ARMED is FALSE, the cycle repeats at decision box 202. If ANON_ARMED is TRUE, then at step 204 the "Anonymous Operation Armed" annunciator 152 in the cockpit may be enabled (e.g., illuminated). The variable ANON_ARMED may be controlled in the cockpit via an operator on panel 99, which may be on control head 120, glass panel display 110, annunciator panel 150 (e.g., switch 158), or other suitable location.

At decision box 206, a second state variable, ANON_AUTH, may be evaluated. The value of variable ANON_AUTH may be automatically determined by UAT 100 based on altitude and other appropriate parameters. Although not shown in FIG. 2, some embodiments include programming UAT 100 according to government regulations that spell out appropriate scenarios for use of anonymous functionality. Such information may be stored in memory of UAT 100 and accessed by a computer processor of UAT 100 at decision box 206 to compare altitude other appropriate parameters to preprogrammed conditions based on government regulations. For instance, if UAT 100 assesses the current altitude to be greater than or equal to flight level 180, UAT 100 may set ANON_AUTH to FALSE. On the other hand, if UAT 100 determines the current altitude to be less than, flight level 180, and if any other requirements for anonymous operation are satisfied, UAT 100 may set ANON_AUTH to TRUE. UAT 100 may include nonvolatile memory programmed with various criteria for setting the variable ANON_AUTH. Such criteria may be updatable in the field.

A third state variable, ANON_OP, may store whether or not the aircraft is currently operating in an anonymous mode. At decision box 206, if variable ANON_AUTH is FALSE, at decision box 208, the variable ANON_OP may be evaluated. If ANON_OP equals FALSE, meaning the aircraft is operating in traditional mode, the cycle may repeat at decision box 202. However, if ANON_OP equals TRUE, at step 210, the variable ANON_OP may be reset to FALSE, UAT 100 may cease ADS-B OUT transmission, and, with a compatible transponder 160 (FIG. 1), set transponder 160 to broadcast in Mode S. In this manner, compliance with regulations requiring 1090 MHz extended squitter operations may be automatically maintained. The cycle may then repeat at decision box 202.

Although in one or more embodiments, step 210 may occur automatically, in other embodiments, step 210 may require affirmative input from the cockpit before being performed, such as by operation of switch 159, thereby ensuring complete control flight crew. In one or more embodiments, flight crew may be notified that anonymous operations are not authorized, and the flight crew may then manually disable ADS-B OUT transmission by UAT 100 and manually enable Mode S operation transponder 160, using, for example, control head 120.

At decision box 206, if variable ANON_AUTH is TRUE, at step 212 the "Anonymous Mode Authorized" annunciator 154 in the cockpit may be enabled (e.g., illuminated). Next, at decision box 214, the variable ANON_OP may be evaluated. If ANON_OP equals TRUE, meaning the aircraft is currently already operating in anonymous mode, at step 218 the "Anonymous Operation" annunciator 156 in the cockpit may be enabled (e.g., illuminated), and the cycle may be repeated at decision box 202. However, if ANON_OP equals FALSE, at step 216, the variable ANON_OP may be set to TRUE, UAT 100 may commence ADS-B OUT transmission with a random 24-bit aircraft address, and, with a compatible transponder 160 (FIG. 1), set transponder 160 to broadcast in Mode C. In this manner, anonymity is automatically maintained when authorized. The cycle may then repeat at decision box 202.

Although in one or more embodiments, step 216 may occur automatically, in other embodiments, step 216 may require affirmative input from the cockpit, such as by operation of switch 159, before being performed, thereby ensuring complete control flight crew. In one or more embodiments, flight crew may be notified that anonymous operations are authorized, and the flight crew may then manually enable ADS-B OUT transmission by UAT 100 and manually switch to Mode C operation transponder 160, using, for example, control head 120.

Although the autonomous anonymity functionality has been described as being provided by UAT 100, such functionality may also be provided by transponder 160 or another component communication with UAT 100 and/or transponder 160.

While various embodiments have been illustrated in detail, the disclosure is not limited to the embodiments shown. Modifications and adaptations of the above embodiments may occur to those skilled in the art. Such modifications and adaptations are in the spirit and scope of the invention.

What is claimed:

1. An autonomous anonymity system, comprising:
a universal access transceiver, said universal access transceiver designed and arranged to selectively provide a notification when autonomous aircraft operation is authorized; and
a Mode S transponder operatively coupled to and controllable by said universal access transceiver, said universal access transceiver designed and arranged to cause said transponder to operate in Mode C when autonomous aircraft operation is authorized.

2. A method for providing autonomous anonymity, comprising the steps of:
arming a universal access transceiver for automatic anonymous operation;
determining by said universal access transceiver when anonymous operation is authorized
providing a notification by said universal access transceiver when anonymous operation is authorized; and
controlling a mode S transponder, by said universal access transceiver, to operate in mode C when anonymous operation is authorized.

* * * * *